Nov. 1, 1960

V. S. DANIELSON 2,958,429

SHOCK ABSORBING MECHANISMS

Filed Jan. 31, 1957

Inventor
Vernon S. Danielson
By Edward P. Jurow
Atty.

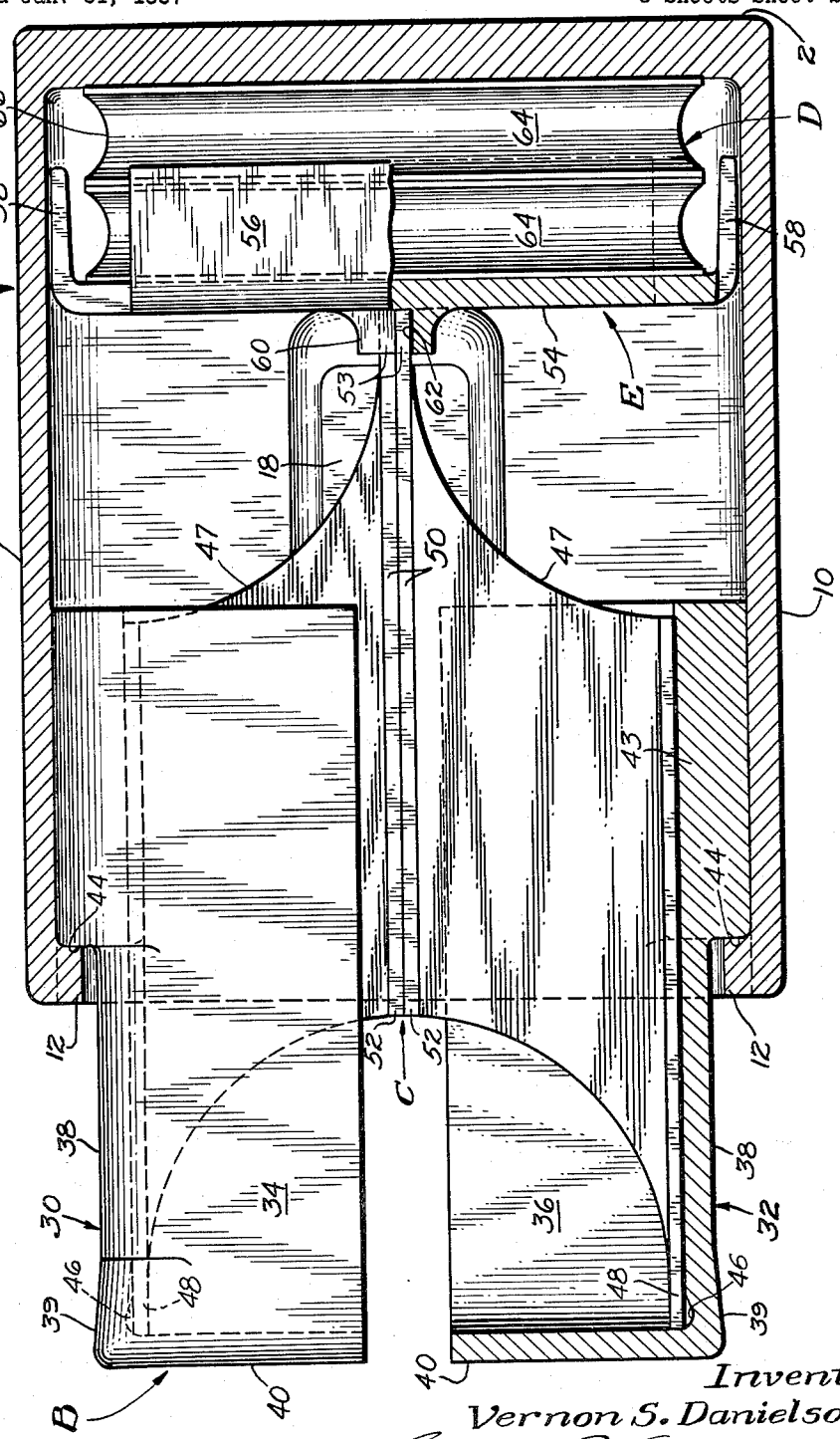

Nov. 1, 1960 V. S. DANIELSON 2,958,429
SHOCK ABSORBING MECHANISMS
Filed Jan. 31, 1957 3 Sheets-Sheet 3
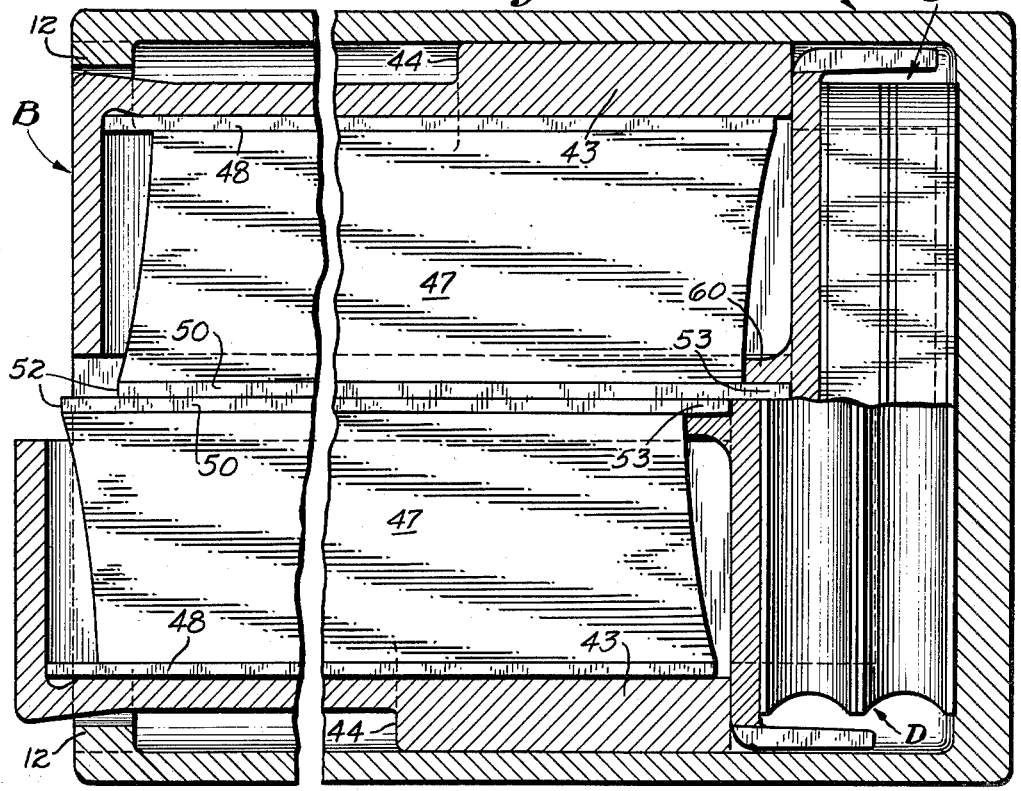
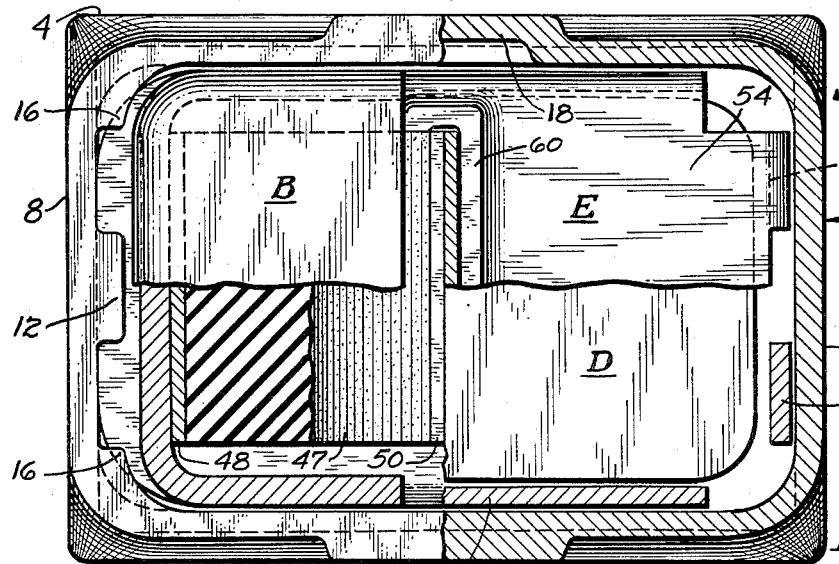
Inventor
Vernon S. Danielson
By Edward ⟨signature⟩
Atty.

United States Patent Office 2,958,429
Patented Nov. 1, 1960

2,958,429

SHOCK ABSORBING MECHANISMS

Vernon S. Danielson, Chicago Heights, Ill., assignor to W. H. Miner, Inc., Chicago, Ill., a corporation of Delaware Filed Jan. 31, 1957, Ser. No. 637,479

7 Claims. (Cl. 213—45)

This invention relates to shock absorbing mechanisms and particularly to draft gears for railroad vehicles.

A general object of the invention is to provide a shock absorbing mechanism employing resilient units stressed in shear and compression, respectively, which ensure low cushioning resistance during initial travel or closure of the gear and which provide progressively increasing resistance to closure of the gear until the device reaches its predetermined maximum capacity.

Another object of the invention resides in a draft gear using shear stressed resilient units embraced by a two-part plunger telescopically movable within an open-ended shell having an integral rear wall whereby economy of manufacture, ease of assembly and disassembly and simplified maintenance can be achieved.

Another object of the invention is to provide a shock absorbing mechanism comprising a housing, resilient means deformable by externally applied shear forces and in force-transmitting relation with said housing, and a plunger which is telescopically slidable relative to said housing, which partially surrounds said resilient means, and which is in force-transmitting relation with said resilient means.

Still another object of the invention lies in the provision of a shock absorbing mechanism which includes a shell, resilient compression units located adjacent to one end of said shell, resilient units deformable by externally applied shear forces in force-transmitting engagement with said compression units, and a plunger which is telescopically slidable relative to the other end of said shell, which partially surrounds and which is in force-transmitting relation with said shear stressable units.

Other objects of the invention will be appreciated from the following description of the draft gear according to the invention.

In the accompanying drawings,

Figure 2 is a top view in partial cross section of the gear shown in Figure 1, the gear being shown in its relaxed, non-operative position;

Figure 1:
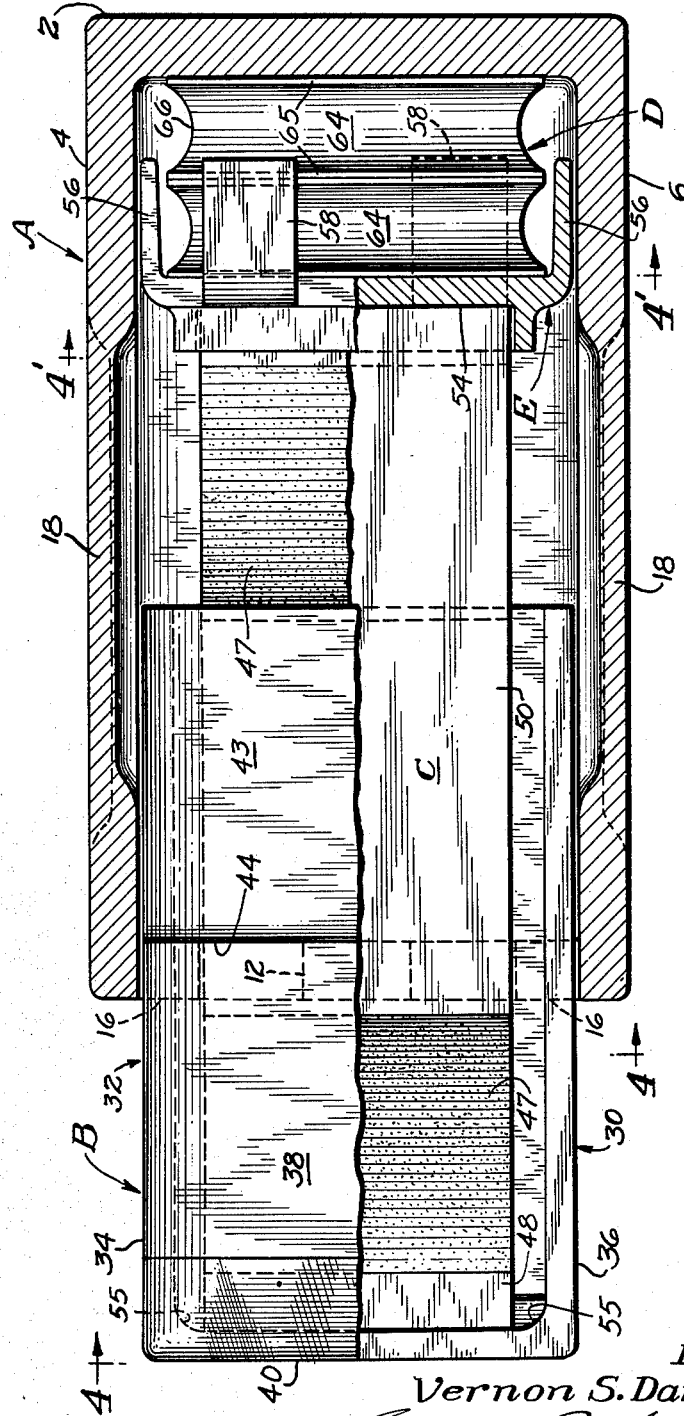
Figure 1 is a side view with portions broken away of the draft gear illustrated in Figure 2.

Figure 3 is a view similar to Figure 2 in which the lower half of Figure 3 shows the gear in partially closed position, and the upper half thereof illustrates the gear in fully closed position; and Figure 4 is an end view of the gear along the sections 4—4 and 4'—4' of Figure 1, the section 4—4 being shown to the left of the vertical center of Figure 4 while the section 4'—4' is shown in the right hand portion thereof.

Referring now to the drawings, Figures 1 and 2 illustrate the draft gear in its normal or fully extended condition, such draft gear comprising, in general, an open-ended casing A, a plunger B, resilient shear stressable means C, resilient compression units D, and a separator plate E interposed between the means C and the units D.

The open-ended casing or shell A has a rear wall 2, top and bottom walls 4 and 6, and side walls 8 and 10. At the front ends of the side walls 8 and 10, short central flanges 12 are provided which extend inwardly of the shell. Similarly, as can be determined from Figure 4, inwardly extending corner flanges 16 are provided at the corners between the side and bottom, and side and top walls, respectively. For strength and rigidity, the front and rear wall portions of the top and bottom walls are of a thicker section than the central portion 18 of said top and bottom walls.

As shown in the drawings, the plunger B is in two portions 30 and 32. These portions are symmetrical in construction, each being substantially U-shaped in cross section and having top and bottom walls 34 and 36, a side wall 38 and a front wall 40. The side wall 38 flares or tapers outwardly at the front end thereof, as at 39, and has a thickened rear end 43 forming a shoulder 44 which is engageable with one of the central flanges 12 as well as with certain of the corner flanges 16 on the side walls of the housing A. The thickened rear end 43 of the side wall of the plunger to the rear of the shoulder 44 is of substantial length to provide alignment of the plunger as a whole as it telescopically slides within the casing. From Figure 2 it will be noted that a relief space 46 is provided at the forward inner corner of the plunger portions 30 and 32. The relief space 46 permits the obtaining of a solid engagement of a metal plate 48 of the resilient means C with the inner surface of the front wall 40 of the plunger.

The plunger B surrounds the resilient means C only partially; this effect is obtainable because of the two-part construction of the plunger B. The resilient means C, which is deformable by an externally applied shear force, consists of two units, each comprising a rubber pad 47 which is bonded to two metal plates 48 and 50. It is preferred that the plates 48 and 50 be parallel to each other. In the normal or non-operative condition of the gear, one plate 50 is longitudinally offset relative to the other plate 48 of the same unit. The two resilient units are arranged as can clearly be seen from Figure 2 to have two of the plates 50 and 50 in face-to-face engagement with each other, the remaining outer plates 48 and 48 each being in face-to-face contact with the inner surface of a side wall 38 of a plunger half 30 or 32. The front ends of the plates 48 and 48 are in abutting relation with the front wall 40 of the plunger. The two central plates 50 and 50 have free non-abutting ends 52 at the front thereof and rear ends 53 which are in abutting relation with the separator plate E. It will be noted that each of the plates 48 and 50 is of such a width as to be free of contact with the top and bottom walls of the casing or the top and bottom walls of each plunger part. This is necessitated by the presence of the stress relieving fillets 55 provided in the inner corners between the front 40 and side walls 38 of the plunger part. Of course, if the fillets 55 were to be omitted or if the corresponding corners of the plates were suitably rounded, then the plates 48 and 50 could be of a width substantially equal to the distance between the inner top wall surface and the inner bottom wall surface of a plunger half.

Disposed between the resilient compression units D and the rear ends of the plates 50 and 50 is the separator plate E, which acts as a means for transmitting force from the resilient means C to the compression units. Such separator plate E is in the form of a substantially rectangular base member 54 having rearwardly extending flanges 56 at the top and bottom edges thereof. The base member also has interrupted, rearwardly extending flanges 58 projecting from the side edges thereof. The space between the flanges 58 provided by interrupting same is sufficient to permit the separator plate to be placed through the front end of the casing and clear the central flanges 12. Since the corner sections of the base member 54 are removed, there is no interference with the corner flanges 16 during placement of the separator plate within the casing. The front surface of the base member 54 is provided with a forwardly extending protuberance 60 which is grooved as at 62 to receive and guide the rear ends 53 of the two facing metal plates 50—50 of the shear units. The flanges 56 and 58 of the separator plate are of a length longitudinally of the casing insufficient to permit contact of the flanges 56 and 58 with the inner surface of the rear wall 2 when the gear is in its fully closed position, namely, when the compression units are compressed to their predetermined maximum extent which will occur when the front surface of the front wall 40 of the plunger is flush with the front edge of the casing.

The compression units D are shown in contact with each other and the rearmost one in contact with the rear wall of the casing. Each of the compression units D comprises a rubber pad 64 having metal plates 65 bonded to the two major faces thereof and the peripheral edge undercut as at 66 to provide a flow space for the displaced rubber during the compressed stage of the unit. The metal plate 65 adjacent the ends 53 of the plates 50 can be of increased thickness to transmit load forces imposed by the plates 50, whereby, if desired, the separator plate E can be omitted from the assemblage.

To assemble the draft gear according to the invention, the casing A is preferably placed upon a support with its open end uppermost. The compression units D are then placed within the casing and seated against the rear wall 2 thereof, and the separator plate E is likewise inserted through the front end of the casing and placed over the units D. Next, the two units comprising the resilient shear stressable means C are placed into face-to-face relation with each other so that the metal plates 50, 50 are in contact and project in a rearward direction. The two halves 30 and 32 of the plunger B are then placed about the assembled shear units. Lateral compressive force is applied to the side walls 38 of the plunger halves until the lateral dimension of the assembled plunger B is reduced to clear the central flanges 12 as well as the corner flanges 16 of the casing A. While maintaining such compressed condition of the plunger, same is inserted within the casing and the rear ends 54 of face-to-face plates 50 are guided into the groove 62 of the separator member E. Longitudinal rearward force is then applied to the front of the plunger until the shoulders 44 clear the inner edges of the flanges 12 and 16. If the compressive force maintaining the plunger halves in reduced condition has not been previously removed, it may be done at this time and the plunger halves 30 and 32 will snap outwardly and seat themselves with the shoulders 44 behind the flanges 12 and 16 and with the rear ends 43 in slidable frictional engagement with the inner surfaces of side walls 8 and 10. It is desirable to have an initial stress in the resilient units to maintain the draft gear in tight assembly. Of course, if desired, an initial compressive and/or shear stress may be imposed on the respective units to obtain a higher gear capacity.

During operation, the resilient means C provides a low resistance to closure of the plunger through a portion of the travel thereof. The resistance to plunger travel afforded by the resilient means C is enhanced by the frictional resistance between the thickened rear ends 43 and the associated inner surfaces of the side walls 8 and 10. When the stress in the resilient units C reaches equilibrium with that in the compression units, both sets of units will be stressed equally as the plunger continues its further travel. When the rear end 43 of the plunger abuts the separator plate E, further stressing of the units C will cease, and the additional load force will be transmitted to the high resistance compression units D until the gear goes solid, that is, until the front surface of front wall 40 is in transverse alignment with the front edge surfaces of the casing A. It will be noted at this point in the operation of the gear, the flanges on the separator plate E will be in proximity to but free of contact with the inner surface of the rear wall 2.

Although a casing or shell A has been illustrated and described as serving as a housing for the movable members of the gear, it should be understood that within the broad scope of the invention herein disclosed any form of enclosure can be employed in lieu of a unitary housing, such as for example the space between the center sills of a railway car, in which event suitable front and rear stop lugs may be secured to the sills to function as the equivalent of the flanges 12 and 16 at the front of the casing and as the rear wall 2 thereof.

Having thus complied with the statutes and shown and described the invention, what I consider new and desire to have protected by Letters Patent is pointed out in the appended claims.

What I claim is:

1. A shock absorbing mechanism comprising an open-ended housing, a wall at the rear end of said housing, abutment means projecting radially inwardly from the front edge of said housing, resilient compression units disposed adjacent to and in contact with said rear wall, a separator plate in overlying engagement with said compression units, resilient shear stressable units having longitudinally extending metal plates, the ends of certain of which are in force-transmitting engagement with said separator plate, a plunger comprising a pair of laterally spaced complementary portions, shoulders on said plunger portions engageable with said abutment means, said plunger portions being longitudinally slidable relative to the housing, partially surrounding the shear units and being in force-transmitting contact with ends of other of the metal plates of the shear stressable units.

2. A shock absorbing mechanism comprising an open-ended housing, a rear wall integral with the rear end of said housing, abutment means projecting radially inwardly from the front edge of said housing, resilient compression units disposed adjacent to and in contact with said rear wall, a flanged separator plate in engagement with said compression units, resilient shear stressable units in force-transmitting engagement with said separator plate, a plunger, shoulders on said plunger engageable with said abutment means, said plunger being longitudinally slidable relative to the housing, partially surrounding the shear stressable units and being in force-transmitting relation with said shear stressable units.

3. A shock absorbing mechanism comprising an open-ended housing, a wall at the rear end of said housing, abutment means projecting radially inwardly from the front edge of said housing, resilient compression units disposed adjacent to and in contact with said rear wall, a plate in engagement with said compression units, resilient shear stressable units in force-transmitting engagement with said plate, a plunger comprising a pair of laterally spaced apart complementary portions, each consisting of a top and bottom wall section integral with a side wall and with a front wall, said side wall having an outwardly projecting shoulder intermediate the front and rear ends thereof, the shoulders being engageable with said abutment means, the plunger being longitudinally slidable relative to the housing, partially surrounding the shear stressable units and being in force-transmitting relation with said shear stressable units.

4. A shock absorbing mechanism comprising an open-ended housing, a rear wall integral with the rear end of said housing, flanges projecting radially inwardly from the front edge of said housing, a group of resilient compression units disposed in contact with said rear wall, a separator plate in engagement with said compression units, flanges extending rearwardly from said plate, a grooved portion on the front face of said plate, a pair of resilient shear stressable units, each comprising a rubber pad located between and bonded to a pair of metal plates longitudinally offset relative to each other, such shear stressable units being disposed face-to-face in symmetry to each other, the rear ends of the central pair of metal plates being received in the groove of the separator plate, the front ends of each of the outer plates being in contact with a plunger which is rectilinear in cross section and which comprises a pair of laterally spaced complementary portions partially surrounding the shear stressable units, each of such complementary portions consisting of a top and bottom wall section integral with a side wall and with a front wall, said side wall having an outwardly projecting shoulder intermediate the front and rear ends thereof, such shoulders being engageable with the flanges on the housing.

5. A shock absorbing mechanism comprising a shell; resilient compression units transversely positioned at one end of the shell; a transversely extending plate member overlying said units and having flanges extending rearwardly from the edges thereof and a central groove on the front face thereof; a pair of shear stressable resilient units, longitudinally disposed in face-to-face symmetrical relation to each other and each comprising a rubber pad located between and bonded to a pair of metal plates longitudinally offset relative to each other, one end of each of the central pair of metal plates being seated within the central groove of the transversely extending plate member; a plunger telescopically slidable relative to the other end of the shell and comprising a pair of transversely spaced complementary portions, each partially surrounding the shear stressable units and each consisting of a top and bottom wall section integral with a side wall and with a front flange, said front flanges being in contact with ends of the outer plates of the shear stressable units.

6. A shock absorbing mechanism comprising a shell; metal-faced compression units positioned transversely of the longitudinal axis of the shell at one end thereof; resilient shear stressable units comprising pads of rubber each having a pair of metal plates which are each bonded to the opposite faces thereof and longitudinally offset relative to each other, the ends of certain of said plates being in contact with one of the compression units; and a plunger telescopically slidable relative to the other end of the shell and comprising a pair of laterally spaced complementary portions, each partially surrounding said shear stressable units and each consisting of a top and bottom wall section integral with a side wall and with a front flange, said front flanges being in contact with the ends of the other plates of said shear stressable units.

7. A shock absorbing mechanism comprising a shell, compression units positioned transversely of the longitudinal axis of the shell at one end thereof, a transversely extending separator overlying said units, resilient shear stressable units comprising pads of rubber having pairs of metal plates bonded to the opposite faces thereof and longitudinally offset relative to each other, the ends of certain of said plates being in contact with the separator, and a plunger telescopically slidable relative to the other end of the shell and comprising a pair of laterally spaced complementary portions, each partially surrounding said shear stressable units and each consisting of a top and bottom wall section integral with a side wall and with a front flange, said front flanges being in contact with the ends of the other plates of said shear stressable units.

References Cited in the file of this patent

UNITED STATES PATENTS

| | | |
|---|---|---|
| 2,565,650 | Dath | Aug. 28, 1951 |
| 2,650,719 | Dath | Sept. 1, 1953 |
| 2,650,721 | Bourdon | Sept. 1, 1953 |
| 2,656,936 | Danielson et al. | Oct. 27, 1953 |
| 2,692,057 | Dentler | Oct. 19, 1954 |
| 2,767,859 | Fillion | Oct. 23, 1956 |
| 2,767,861 | Fillion | Oct. 23, 1956 |